United States Patent
Hogasten (10) Patent No.: US 8,208,755 B1
(45) Date of Patent: Jun. 26, 2012

(54) SCENE BASED NON-UNIFORMITY CORRECTION SYSTEMS AND METHODS

(75) Inventor: Nicholas Hogasten, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 13/205,416

(22) Filed: Aug. 8, 2011

Related U.S. Application Data (63) Continuation of application No. 12/103,658, filed on Apr. 15, 2008, now Pat. No. 7,995,859.

(51) Int. Cl.
*G06K 9/40* (2006.01)
(52) U.S. Cl. .................................................. 382/275
(58) Field of Classification Search .......... 382/274–275, 382/254, 312, 103, 236, 218, 209, 305, 294, 382/284, 278; 348/151–169, 241; 250/208.1, 250/557, 332, 330, 338.1, 333, 252.1
See application file for complete search history.

(56) References Cited

U.S. PATENT DOCUMENTS

| | | | |
|---|---|---|---|
| 4,298,887 A | 11/1981 | Rode | |
| 6,507,018 B2 | 1/2003 | Young | |
| 6,901,173 B2 | 5/2005 | Alderson et al. | |
| 7,502,515 B2 * | 3/2009 | Gu et al. | 382/236 |
| 7,634,157 B1 * | 12/2009 | Richards et al. | 382/305 |
| 7,683,321 B1 | 3/2010 | King et al. | |
| 7,684,634 B2 | 3/2010 | Kilgore | |
| 7,738,008 B1 | 6/2010 | Ball | |
| 7,772,557 B2 | 8/2010 | Anderson | |
| 7,795,578 B2 | 9/2010 | Hogasten et al. | |
| 8,067,735 B2 | 11/2011 | King et al. | |

FOREIGN PATENT DOCUMENTS

| | | |
|---|---|---|
| WO | WO 01/28233 A1 | 4/2001 |
| WO | WO 2007/106018 A1 | 9/2007 |
| WO | WO 2007/123453 A2 | 11/2007 |

OTHER PUBLICATIONS

Hardie, et al., Scene-based nonuniformity correction with video sequences and registration, Optical Society of America, vol. 39, No. 8, Applied Optics, Mar. 10, 2000, 10 pages.
Christopher A. Rice, Fast Scene Based Nonuniformity Correction With Minimal Temporal Latency, Master's Thesis, Sep. 14, 2006, 61 pages.

(Continued)

*Primary Examiner* — Ishrat I Sherali
(74) *Attorney, Agent, or Firm* — Haynes and Boone, LLP

(57) ABSTRACT

Systems and methods provide scene-based non-uniformity correction for infrared images, in accordance with one or more embodiments. For example in one embodiment, a method of processing infrared images of a scene captured by an infrared image sensor comprising a plurality of sensor elements includes receiving a first frame comprising a first plurality of pixel data of a first infrared image; receiving a second frame comprising a second plurality of pixel data of a second infrared image; determining frame-to-frame motion between the first frame and the second frame, wherein the frame-to-frame motion identifies portions of the first and second pixel data corresponding to identical scene coordinates captured by different sensor elements for the first and second frames; determining irradiance differences between the first and second portions of pixel data; and determining pixel offset information for scene based non-uniformity correction terms based on the irradiance differences and the frame-to-frame motion.

20 Claims, 6 Drawing Sheets

OTHER PUBLICATIONS

Ratliff et al., Generalized algebraic scene-based nonuniformity correction algorithm, Department of Electrical and Computer Engineering, The University of New Mexico, vol. 22, No. 2, Feb. 2005, J. Opt. Soc. Am. A, 11 pages.

Harris et al., Minimizing the "Ghosting" Artifact in Scene-Based Nonuniformity Correction, Proc. SPIE vol. 3377, p. 106-113, Infrared Imaging Systems: Design, Analysis, Modeling, and Testing IX, 1998, 8 pages.

Torres et al., Scene-based nonuniformity correction for focal plane arrays by the method of the inverse convariance form, vol. 42, No. 29, Applied Optics, Oct. 10, 2003, 10 pages.

Ratliff et al., Radiometrically accurate scene-based nonuniformity correction for array sensors, Department of Electrical and Computer Engineering, The University of New Mexico, J. Opt. Soc. Am. A, vol. 20, No. 10, Oct. 2003, 10 pages.

Peter Torle, Scene-based correction of image sensor deficiencies, Master's thesis in image processing at Linkoping Institute of Technology, LiTH-ISY-EX-3350, 2003, May 6, 2003, 83 pages.

Pezoa et al., Multimodel Kalman filtering for adaptive nonuniformity correction in infrared sensors, Department of Electrical and Computer Engineering, The University of New Mexico, J. Opt. Soc. Am. A, vol. 23, No. 6, Jun. 2006, 10 pages.

Torres et al., Kalman filtering for adaptive nonuniformity correction in infrared focal-plane arrays, Department of Electrical Engineering, The University of Concepcion, J. Opt. Soc. Am. A, vol. 20, No. 3, Mar. 2003, 11 pages.

Ideker, T., "Offset Correction Techniques for Imaging Sensors Using Random Dither Information". Thesis Massachusetts Institute of OD Technology, Jun. 1, 1995, pp. 1-193.

Astrid Lundmark and Leif Haglund, "Adaptive Spatial and Temporal Prefiltering for Video Compression" Lecture Notes in Computer Science, vol. 2749/2003, 2003 pp. 953-960.

\* cited by examiner

1. Δx=−3, Δy=−1, cert=0.7, FPN=12
2. Δx=−4, Δy=−1, cert=0.7*0.8, FPN=12+7
3. Δx=−2, Δy=1, cert=0.7*0.8*0.3, FPN=12+7−5
4. Δx=−1, Δy=2, cert=0.7*0.8*0.3*0.9, FPN=12+7−5+0
5. Δx=2, Δy=3, cert=0.7*0.8*0.3*0.9*0.8, FPN=12+7−5+0−8
6. Δx=5, Δy=3, cert=0.7*0.8*0.3*0.9*0.8*0.2, FPN=12+7−5+0−8−5
7. Δx=5, Δy=2, cert=0.024*0.3=0.007, FPN=12+7−5+0−8−5+21=22

+ Golden Pixel
− Learning Pixels
□ Enlightened Pixels

SCENE BASED NON-UNIFORMITY CORRECTION SYSTEMS AND METHODS

CROSS-REFERENCE TO RELATED APPLICATIONS

This patent application is a continuation of U.S. patent application Ser. No. 12/103,658 filed Apr. 15, 2008, which is incorporated herein by reference in its entirety.

TECHNICAL FIELD

The present invention relates generally to an infrared imaging system and, more particularly, to systems and methods for processing infrared image data.

BACKGROUND

An image generated by an infrared imager, such as for example a microbolometer-based infrared imager, typically includes noise. For example, the dominant source of noise may result from fixed pattern noise (FPN), particularly for uncooled microbolometer imagers. The source of FPN may be due, for example, to non-linearity of sensor elements, reflections inside the camera, temperature gradients within the system, non-linearity of the electronics, particles or water on the lens in front of the shutter, and/or a non-uniform temperature of the shutter (e.g., if not completely defocused). The source of the FPN may, at least in part, determine the appearance of the FPN in the image, with uncooled imagers typically having a higher portion of low spatial frequency FPN than cooled cameras.

In general, the FPN may have different characteristics, depending on the infrared detector, the system, and the system environment. For example, FPN may be barely noticeable or it may cause severe distortion of the image to the point that the video is no longer useful. A typical infrared imaging system may include calibration algorithms to try to minimize the effect of non-linearity and internal temperature effects. In practice, this has proven difficult and systems generally use an internal shutter that lets the system acquire an image against a uniform target to calibrate. The system may assume that any deviations from uniformity are due to FPN, with processing performed to account for the deviations (e.g., performing a non-uniformity correction (NUC)). As an example for a single shutter system with a fixed temperature, offsets in the data may be corrected (e.g., referred to as a one point correction). If the temperature of the shutter can be varied or multiple shutters at different temperatures exist, the gains can also be corrected by calculating each sensor element's response to a given temperature change (e.g., referred to as a two or multi point correction).

Often, even after performing a one or two point correction, some residual FPN will exist, because the updated NUC corrections generally only correct for non uniformity due to sources between the shutter and the detector (e.g., with the shutter between the detector and the lens). Additionally, the scene temperature is generally different from that of the shutter and the detector elements are not completely linear and, therefore, a correction made at the shutter temperature is not always appropriate for the particular scene that the system is imaging.

As a result, there is a need for improved techniques directed to infrared imaging and FPN.

SUMMARY

Systems and methods are disclosed herein to provide scene-based non-uniformity correction for an infrared image (e.g., from a microbolometer sensor of an infrared imaging system), in accordance with one or more embodiments. For example, in accordance with an embodiment of the present disclosure, a method of processing infrared images includes storing a template frame comprising a first plurality of pixel data of an infrared image; receiving an input frame comprising a second plurality of pixel data of an infrared image; determining frame-to-frame motion between at least some of the first and second plurality of pixel data; warping the template frame based on the determining of the frame-to-frame motion; comparing the first plurality of pixel data to the second plurality of pixel data to determine irradiance differences based on the determining; propagating pixel offset information for scene based non uniformity correction terms, based on the determining of the frame-to-frame motion, for at least some of the scene based non uniformity correction terms to other ones of the scene based non uniformity correction terms; updating the scene based non uniformity correction terms based on the comparing and the propagating; applying the scene based non uniformity correction terms to the second plurality of pixel data to reduce fixed pattern noise; and providing an output infrared image after the applying.

In accordance with another embodiment, a system includes an infrared image sensor adapted to provide pixel data of an infrared image; a memory adapted to store the pixel data; and a controller adapted to perform infrared image processing on the pixel data, the processing comprising: generating a template frame comprising a first plurality of pixel data; receiving an input frame comprising a second plurality of pixel data from the infrared image sensor; determining frame-to-frame motion between at least some of the first and second plurality of pixel data; comparing the first plurality of pixel data to the second plurality of pixel data to determine irradiance differences; propagating pixel offset information for scene based non uniformity correction terms, based on the determining of the frame-to-frame motion, for at least some of the scene based non uniformity correction terms to other ones of the scene based non uniformity correction terms; updating the scene based non uniformity correction terms based on the comparing and the propagating; and applying the scene based non uniformity correction terms to the second plurality of pixel data to reduce fixed pattern noise.

In accordance with another embodiment, a computer-readable medium stores information for performing an infrared image processing method that includes generating a template frame comprising a first plurality of pixel data generated by an infrared image sensor; receiving a second plurality of pixel data generated by the infrared image sensor; comparing the first plurality of pixel data to the second plurality of pixel data, based on frame-to-frame motion between at least some of the first and second plurality of pixel data, to determine irradiance differences; propagating pixel offset information for scene based non uniformity correction terms, based on the frame-to-frame motion, for at least some of the scene based non uniformity correction terms to other ones of the scene based non uniformity correction terms; updating scene based non uniformity correction terms based on the comparing and the propagating; applying the scene based non uniformity correction terms to the second plurality of pixel data to reduce fixed pattern noise and provide an output infrared image; and storing the output infrared image.

In accordance with another embodiment, a method of processing infrared images of a scene captured by an infrared image sensor comprising a plurality of sensor elements includes receiving a first frame comprising a first plurality of pixel data of a first infrared image; receiving a second frame comprising a second plurality of pixel data of a second infrared image; determining frame-to-frame motion between the first frame and the second frame, wherein the frame-to-frame motion identifies portions of the first and second pixel data corresponding to identical scene coordinates captured by different sensor elements for the first and second frames; determining irradiance differences between the first and second portions of pixel data; and determining pixel offset information for scene based non-uniformity correction terms based on the irradiance differences and the frame-to-frame motion.

In accordance with another embodiment, a system includes an infrared image sensor comprising a plurality of sensor elements and adapted to provide pixel data for a plurality of infrared images; a memory adapted to store the pixel data; and a controller adapted to perform infrared image processing on the pixel data, the processing comprising: receiving a first frame comprising a first plurality of pixel data of a first infrared image, receiving a second frame comprising a second plurality of pixel data of a second infrared image, determining frame-to-frame motion between the first frame and the second frame, wherein the frame-to-frame motion identifies portions of the first and second pixel data corresponding to identical scene coordinates captured by different sensor elements for the first and second frames, determining irradiance differences between the first and second portions of pixel data, and determining pixel offset information for scene based non-uniformity correction terms based on the irradiance differences and the frame-to-frame motion.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
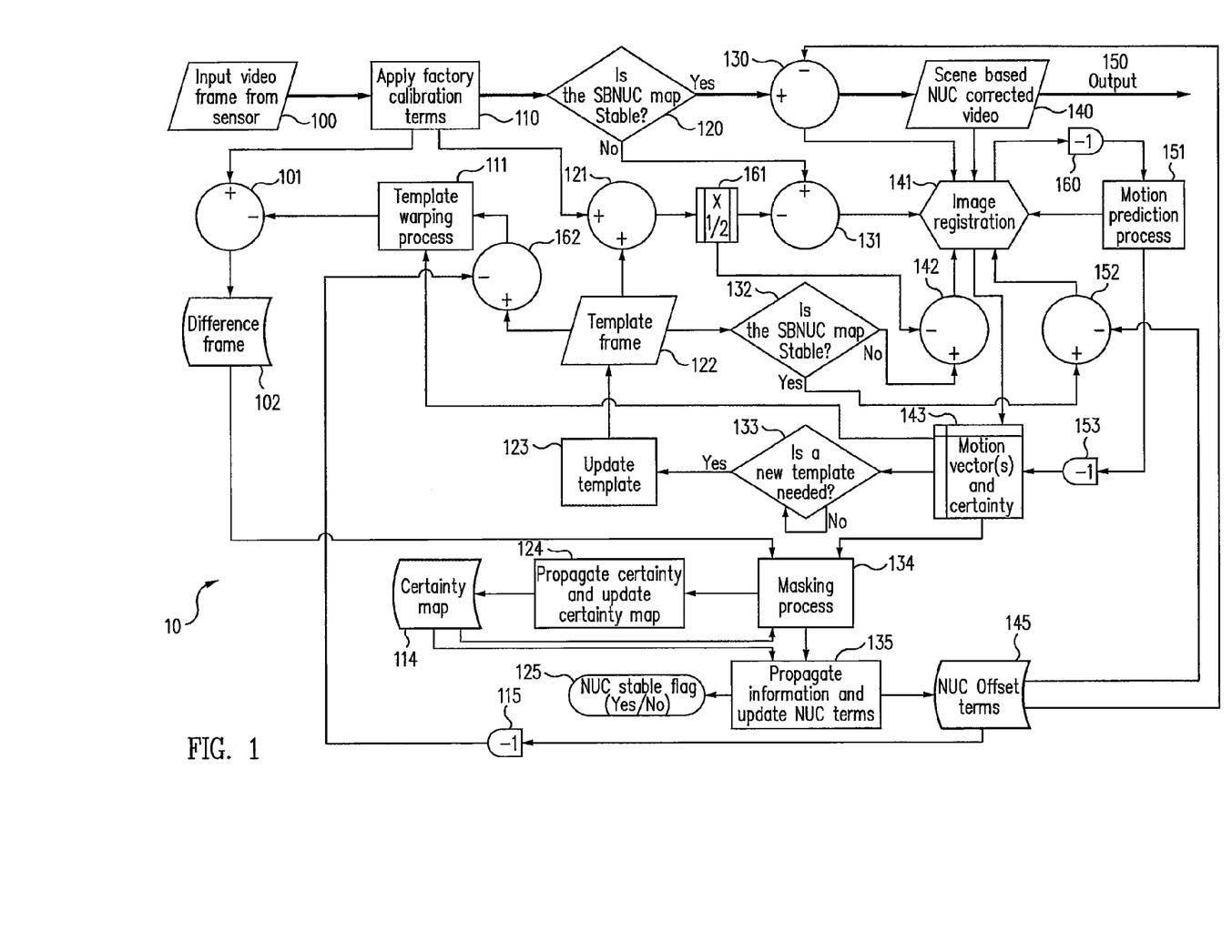
FIG. 1 shows a block diagram illustrating a scene based non-uniformity correction algorithm in accordance with an embodiment of the present invention.

FIG. 1 illustrates a block diagram of an algorithm 10 to perform non-uniformity correction (NUC) on infrared image data. Algorithm 10 may perform NUC based on information contained within the infrared image data of the scene being imaged and may be referred to as scene-based NUC (SB-NUC). For example, algorithm 10 may provide SBNUC for a system that captures multiple images (e.g., image frames) of the scene over time, for example video images generally of a scene from an infrared camera.

In an example embodiment, algorithm 10 may be based on certain principals. For example, the scene irradiance may be assumed to be static over a number of frames (e.g., at least two frames), while the FPN may be assumed to be static over a larger number of frames (e.g., on the order of a hundred frames). The algorithm may also assume that there is some movement relative to the sensor from frame to frame, even where the camera is stationary.

Figure 2:
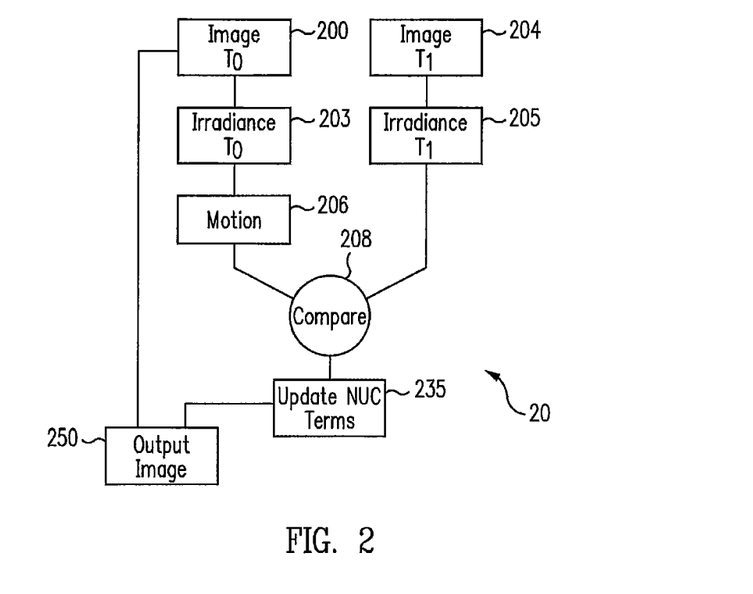
FIG. 2 shows a simplified block diagram illustrating a scene based non-uniformity correction algorithm in accordance with an embodiment of the present invention.

As a specific example, referring briefly to FIG. 2, a simplified block diagram is illustrated of an embodiment of an algorithm 20 for performing SBNUC. In an exemplary embodiment, the system makes a first image at a first time 200, for example a time designated as time zero ($T_0$), and measures the scene irradiance 203 at time $T_0$. The system may take a second image at a second time 204, for example $T_1$, and measure the irradiance of the second frame 205 at time $T_1$. The system may measure and/or calculate 206 the motion (e.g., frame-to-frame motion) of the image relative to the sensor between time $T_0$ and time $T_1$. The system may then compare the irradiance values 208 for identical points/scene coordinates measured by a different sensor element in frame 1 (the frame captured at $T_0$) and frame 2 (the frame captured at $T_1$). The calculated motion is used to determine which of the pixels (imaging some specific scene coordinate) in the first frame correspond to which of the pixels (imaging the same or similar scene coordinates) in the second frame. The system then assumes that any difference in irradiance between the identified points (scene coordinates) is due to FPN. Algorithm 20 may then update a NUC map 235 for all sensor elements that measure irradiance at scene coordinates that are visible in both images. The updated NUC terms may be applied to the image to create an output image 250 with reduced FPN, as would be understood by one skilled in the art.

Figure 3:
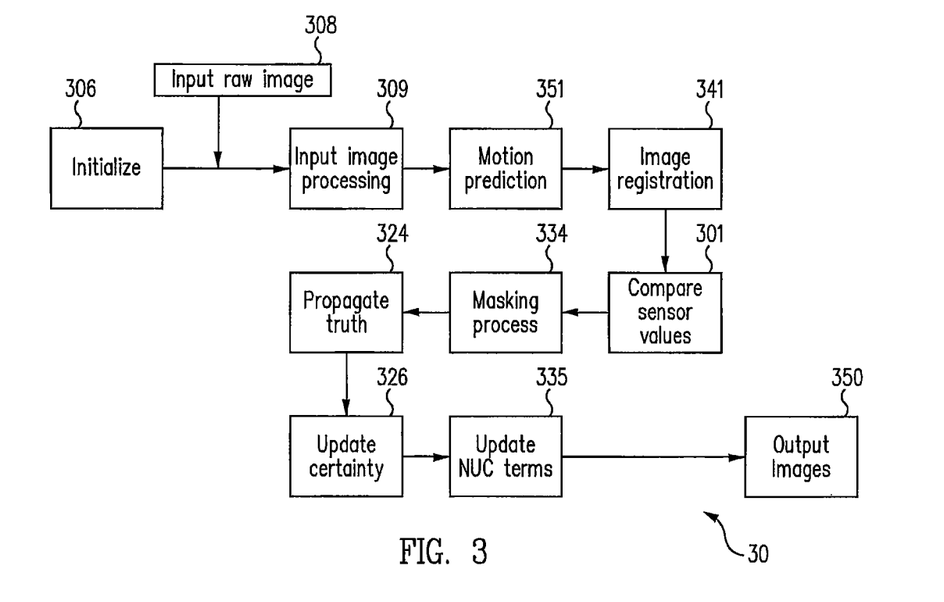
FIG. 3 shows a general block diagram illustrating a scene based non-uniformity correction algorithm in accordance with an embodiment of the present invention.

FIG. 3 illustrates a high level block diagram of an exemplary embodiment of an algorithm 30 for performing SBNUC in accordance with an embodiment of the present invention. Algorithm 30 may represent, for example, a general SBNUC flow diagram, while algorithm 10 (FIG. 1) may represent, for example, an example of a specific implementation of this general SBNUC flow diagram, in accordance with an embodiment. Therefore, reference to elements of FIGS. 1 and 3 will be made in the description that follows to describe the general SBNUC flow and the more specific SBNUC flow implementation.

Algorithm 30 may include initialization 306, receiving input raw image data 308, input image processing 309, motion prediction 351, image registration 341, comparing sensor values 301, masking process 334, propagating truth 324, updating certainty 326, and updating NUC terms 335.

The updated NUC terms may then be applied to the video image to provide an SBNUC-corrected video image 350 for display or recording.

Initialization 306 may be performed at the start of algorithm 30. In an example embodiment, initializing may include initializing data and/or data sets. The data may include a NUC map 145 (FIG. 1), a certainty map 114 (FIG. 1), and a template frame 122 (FIG. 1).

Figure 4:
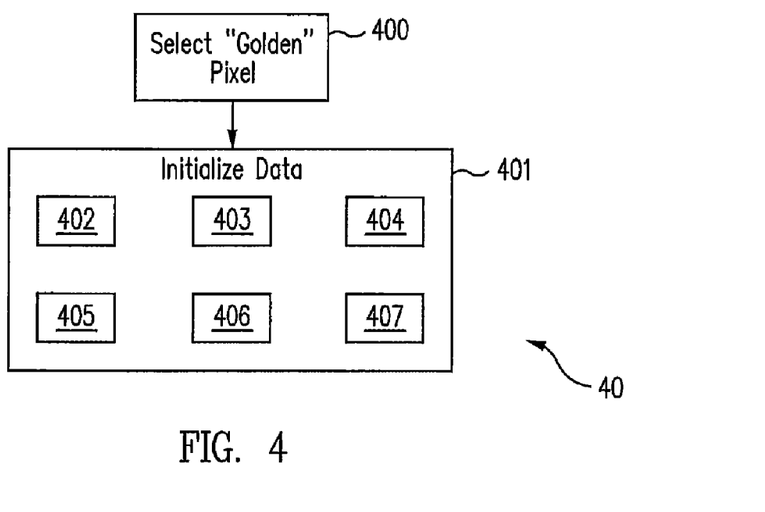
FIG. 4 shows a block diagram illustrating an initialization algorithm in accordance with an embodiment of the present invention.

For example, FIG. 4 illustrates a block diagram of an initialization 40 in accordance with an embodiment, which may represent an example of initialization for initialization 306. Initializing 40 may include first selecting a pixel 400, which is defined to have zero FPN. It should also be understood that modifications and variations using more than one pixel are possible in accordance with the principles of the present invention. For example in other embodiments, more than one pixel may be selected (e.g., with their results later averaged or in other ways merged), but for ease of discussion, selecting one pixel is described here.

The first selected pixel (400) may be referred to as the "golden pixel." The pixel selected as the "golden pixel" should be a pixel which is not associated with a dead or defective sensor or pixel. Any pixel may be chosen, but assuming random motion, the algorithm may converge faster or more efficiently if a pixel close to the center of the infrared sensor (e.g., focal plane array) is chosen.

Initializing 40 may further include initializing and/or storing data sets, which may include a NUC map 402 (e.g., NUC map 145), a certainty map 403 (e.g., certainty map 114), and a template frame 404 (e.g., template frame 122). In an example embodiment, NUC map 402 may contain stored, calculated NUC-terms (e.g., NUC offset terms) from the SBNUC algorithm during operation of the algorithm. Initializing may include initializing NUC map 402, for example setting the NUC map to contain only zeros.

In an example embodiment, certainty map 403 may contain the accumulated certainty for corresponding NUC terms during operation of algorithm 30. Initializing 40 may include initializing certainty map 403, for example setting only the golden pixel (or pixels) to have a certainty greater than zero. The certainty for the golden pixel may be set at a relatively high value at all times during operation, for example up to about ten times the maximum accumulated certainty allowed for any other pixel.

In an example embodiment, initializing may include initializing template frame 404. During operation, the template frame may contain a reference for calculating the difference frame (e.g., difference frame 102 of FIG. 1) and for calculating the frame-to-frame scene motion if scene-based image registration methods are used, as would be understood by one skilled in the art. In its simplest case, for example, the template is the previous frame.

In accordance with an embodiment, initializing may further include initializing a valid pixel map. The valid pixel map may have a Boolean "True" ('1') value for each pixel that has an accumulated certainty greater than some pre-defined threshold. As an example at initialization, only the golden pixel may be valid. The optional valid pixel map may be represented by the certainty map or may be optionally included as part of the certainty map.

In accordance with an embodiment, initializing may further include setting initial values for various additional parameters. For example, a maximum vertical and horizontal motion between compared frames may be set (block 405 of FIG. 4). As another example, the number of frames used for every FPN calculation may be set (block 406 of FIG. 4). If more than two frames are used to calculate the instantaneous FPN, the values in one frame may, for example, be compared to some weighted mean of a number of previous, frames. For computational efficiency, the frames actually used to calculate instantaneous FPN may be a decimated stream of frames (e.g., only every $N^{th}$ frame may be used). Decimating the sequence of frames may be useful, for example, when the frame to frame motion is very slow (i.e., only some fraction of a pixel per frame) and therefore difficult to measure. As another example, FPN threshold and FPN threshold decay values may be set (block 407 of FIG. 4). The threshold may define, for example, the maximum expected FPN level in digital counts, while the threshold decay may define how the threshold should change as information is accumulated. At startup/initialization, for example, higher levels of FPN may be permitted, whereas as the new, updated NUC map stabilizes, the magnitude of the FPN for two compared frames may be further restricted.

Referring again to FIGS. 1 and 3, algorithm 30 (or algorithm 10, which may represent a method or flow diagram) may perform a series of iterations of the SBNUC algorithm, updating the NUC terms 135 to minimize FPN. As an example, a NUC term may not be applied to an image (e.g., via element 130 of FIG. 1) until the NUC term is determined to be stable (e.g., via a NUC stable flag 125). This stabilization may take several seconds of camera motion, depending on the scene and the magnitude of FPN.

In an example embodiment, algorithm 10 may include receiving an uncorrected image or input video frame 100 (FIG. 1, or image data 308 of FIG. 3) from the infrared sensor (e.g., an uncooled microbolometer sensor). The uncorrected image (e.g., raw digitized image data) may then be subject to input image processing 309 (FIG. 3), in accordance with an embodiment, which may include applying factory calibration NUC terms 110 (FIG. 1) to the image to produce an image with the least amount of spatial noise or FPN. Applying the factory calibration NUC terms 110 prior to subjecting the image to the rest of the SBNUC algorithm 10 may simplify the motion calculation. If a valid or stable NUC map 145 from the SBNUC process exists 120, 125, then the SBNUC terms (stored in NUC map 145) may also be applied 130 to the input image. In the event that the signal-to-noise ratio (SNR) is expected to be or determined to be relatively low, the mean 161 of the frames being compared may be subtracted 131 from the input image, which may effectively minimize the effect of FPN, but may lose some of the actual scene signal or desired information.

In accordance with an embodiment, motion prediction 151 (FIG. 1, or 351 of FIG. 3) may be applied to the processed input image. For example, motion prediction 151 may be applied if there are no external motion sensors involved and, thus, the image-based registration algorithm may benefit from a motion prediction stage to limit the search area when calculating frame-to-frame correlation. Motion prediction 151 may be performed, for example, using a Kalman estimator, using a constant velocity assumption (i.e., assuming motion will be the same as it was when previously sampled), or any other suitable extrapolation method as would be understood by one skilled in the art.

In accordance with an embodiment, the image registration 141 (FIG. 1, or 341 of FIG. 3) may be used to calculate the frame-to-frame motion of the sensor. Image registration 141 may include using motion estimate values from a motion platform (e.g., a pan and tilt unit), motor encoders, or sensors (e.g., gyros and/or accelerometers). Depending on the type of imager and its field of view, these motion estimates may be used as is or as an input to an image registration algorithm, as would be understood by one skilled in the art. For example for reference, further details regarding motion estimates (e.g., using gyro information) may be found in the Patent Cooperation Treaty (PCT) Patent Publication WO 2007/106018, entitled "Method for Correction of Non-Uniformity in Detector Elements Comprised in an IR Detector" and published Sep. 20, 2007, which is incorporated herein by reference in its entirety.

As an example for one embodiment, any appropriate image-based registration algorithm may be used. For example, any global (e.g., single motion vector) image registration or local (e.g., per region or per pixel) optical flow algorithm may be used, which may produce an approximately normal distributed error. In general, the quality of the motion estimate algorithm may determine, at least partially, the speed at which the SBNUC algorithm will converge. For example, a mean square error (MSE) of about one pixel may produce a stable map of NUC terms within about five to ten seconds at a 30 Hz frame rate if, as an example, every frame can be used in the calculations and assuming motion is two dimensional (i.e., not along a single axis, for example pan direction only).

In cold and/or humid scenes, the signal from the infrared sensor may be relatively low, while for other scenes, for example, images of the sky or aerial images of the desert or water, the image may be relatively uniform. Under these various conditions, there may be a relatively high likelihood of having greater contrast in the FPN than in the actual scene being imaged (e.g., a SNR<1). As a result, it may be difficult for an image registration algorithm to perform accurately. For example, in some cases, there may seem to be no motion as the greater part of the signal (the FPN) is stable.

Figure 5:
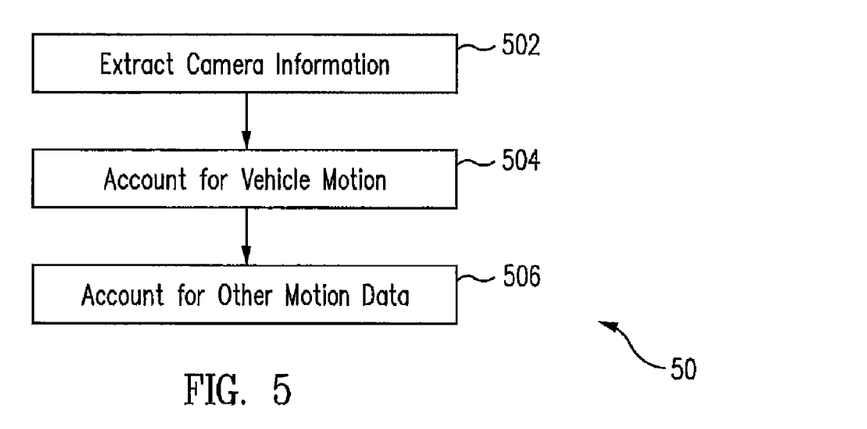
FIG. 5 shows a block diagram illustrating a motion algorithm in accordance with an embodiment of the present invention.

FIG. 5 illustrates a block diagram of an algorithm 50 for calculating the frame-to-frame motion of the infrared image sensor. In accordance with an embodiment, algorithm 50 may include extracting camera motion information 502, for example, from motor drive/encoder and feedback parameters from a motion-controllable platform (e.g., a pan-tilt or gimbal mechanism) provided for the infrared camera (e.g., infrared image sensor). In an example embodiment, this may relate to a fixed or mounted infrared image sensor, in other words one that is not mounted on a plane, car, boat, or other moving object. In an example embodiment, where the infrared image sensor is mounted on a moving platform (e.g., on a plane, car, boat, or other object, such as carried by a person), motion information relating to the motion of the moving platform (i.e., vehicle motion, block 504) would also need to be added to calculate complete frame-to-frame motion.

Rate gyros may be included in or associated with the infrared camera to provide the algorithm with ego motion values (block 506). Depending on the field of view, sensor resolution and type of gyros, these gyros may predict motion, for example, within an accuracy of about one to ten pixels.

In accordance with one or more embodiments, calculating frame-to-frame motion may include using an image registration method or algorithm, as discussed herein (e.g., with respect to image registration 141 and 341 of FIGS. 1 and 3, respectively). For example for reference, further details regarding image registration methods may be found in the Patent Cooperation Treaty (PCT) Patent Publication WO 2007/123453, entitled "Method for Signal Conditioning" and published Nov. 1, 2007, which is incorporated herein by reference in its entirety. Furthermore, calculating frame-to-frame motion may include a combination of gyros and image-based motion estimation techniques in accordance with some embodiments. For this example, the gyro and/or motion platform may provide a coarse estimate of the motion, which may be used by the image registration technique to estimate or calculate a more precise motion and to recalibrate the motion sensors as needed (e.g., as discussed in PCT Patent Publication WO 2007/106018 noted herein).

With respect to FIG. 1 (or FIG. 3), if image registration 141 (or image registration 341) determines that there was sufficient frame-to-frame motion (e.g., greater than the equivalent width of one sensor element, such as one pixel) for at least some part of the scene, then the sensor values of a current image and a previous image may be compared and the difference between measured irradiance of the two frames may be calculated 102. For example, a pixel in template frame 122 (e.g., typically from the previous frame or an older frame) may be compared 101 to the corresponding pixel in the current, processed frame by means of 111 warping the template frame (template warping process 111).

Image registration 141 may be used to determine which pixels in a current frame correspond to which pixels in the template frame (e.g., prior image data frames). In the event that a global (single motion vector) motion is calculated, for example, then the template warping 111 may be reduced to a vertical and horizontal shift. For efficiency purposes, shifts may be rounded to integer pixel numbers and thus, no interpolation may be required. In an example embodiment, the difference data may be stored in a difference frame 102. The data stored in the difference frame 102 may have several sources, which may include temporal noise, image registration error (e.g., including rounding effects), and/or violation of the motion model (e.g., if planar global motion is assumed, (vertical and horizontal shift, then any moving object within the scene may violate the assumption of identical motion in all parts of the scene).

Figure 6:
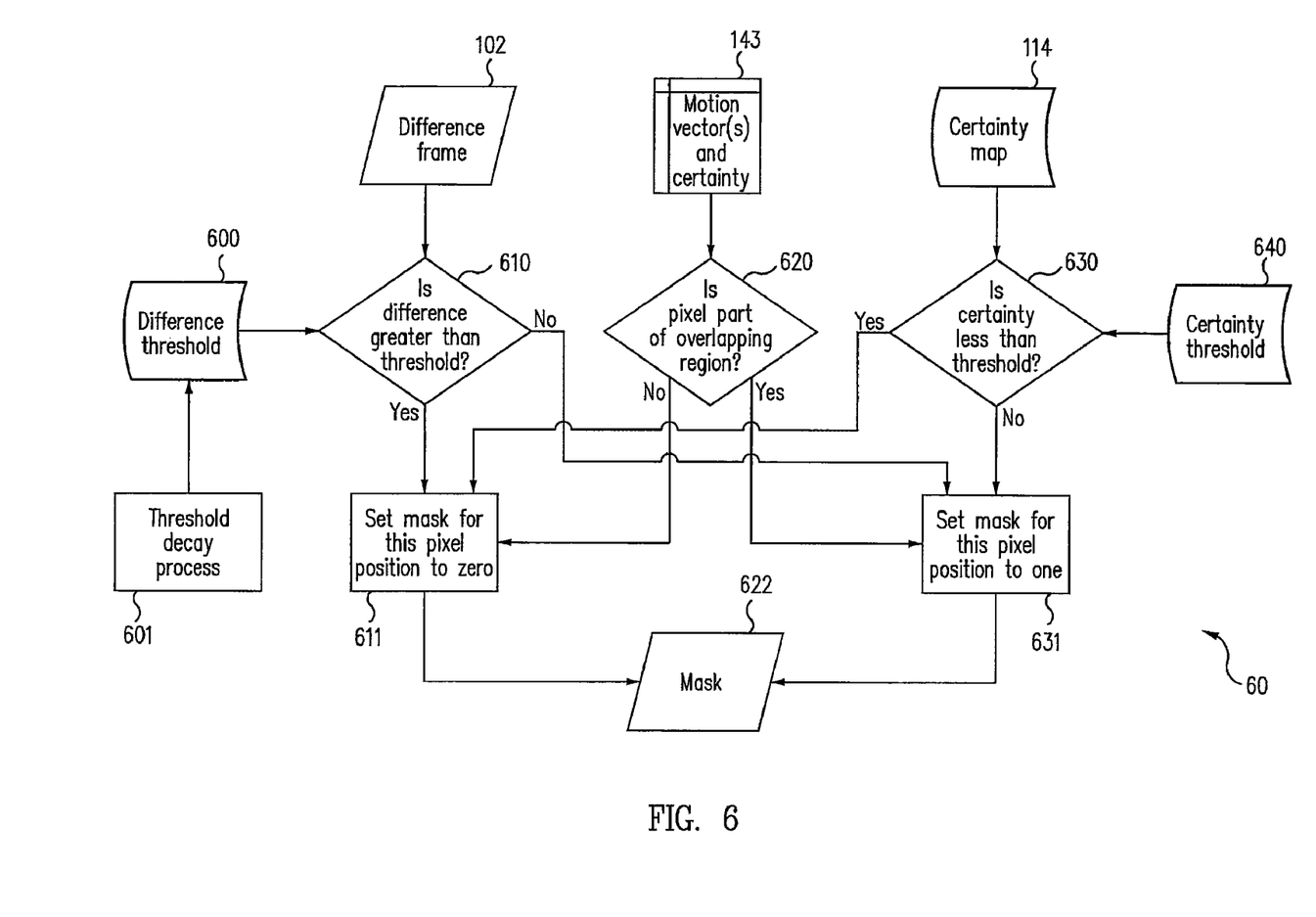
FIG. 6 shows a block diagram illustrating a masking algorithm in accordance with an embodiment of the present invention.

In accordance with some embodiments, steps may be taken to reduce or minimize the possible introduction of image artifacts caused by the SBNUC process (e.g., algorithm 10 or 30). For example, a masking process 134 (or 334 of FIG. 3) may help reduce the risk of such artifacts by masking out pixels based on certain criteria. As a specific example, FIG. 6 illustrates an exemplary embodiment of a masking process 60, which may represent a specific implementation example of masking process 134 (or 334) in accordance with some embodiments of the present invention.

In an example embodiment, only sensor elements (pixels) depicting that part of the scene that is visible in both the current frame and the template frame are to be compared. To account for this, masking process 60 may include masking out non-overlapping portions of the frames 620 as determined by the motion vector(s) 143.

In an example embodiment, only pixels for which the motion vector is known with a certainty 143 greater than a predefined threshold value 640 may be updated. In the case of global motion, the certainty may be the same for all pixels. Masking 60 may include masking out pixels having a certainty that is below the pre-defined threshold 630, 611. In accordance with one or more embodiments, it should be understood that the certainty in certainty map 114 includes information on the quality of the current accumulated FPN value on a per pixel basis, while the certainty mentioned in motion vector and certainty 143 includes information on the instantaneous quality of the last motion estimate. As an example, in the case of a single global motion vector, the whole image may be discarded if the certainty of the motion is below a determined threshold. As a further example, for the case of local motion vectors, every pixel or region/block might have individual certainties and the regions with uncertain motion may be discarded (e.g., masked out).

In accordance with some embodiments, at least part of the scene may be expected to violate the motion model. As a result, there may be some likelihood, for example a high likelihood, of comparing sensor values (e.g., between the current and template frames) which do not correspond to the same or corresponding point in the scene. To compensate for this, a threshold value 600 may be set permitting only a maximum difference in sampled values as stored in difference frame 102. This threshold may dynamically decay, for example, as the accumulated certainty 114 increases and the NUC offset terms 145 stabilize. Initially, a threshold may be set to a relatively large value, for example a value corresponding approximately to the maximum expected amplitude of the FPN. As the NUC terms stabilize, the threshold may be decreased in accordance with a pre-determined decay algorithm 601 so that the risk of introducing artifacts due to violation of the motion model or other registration errors may be minimized.

In accordance with an embodiment, the decaying threshold (T) may be determined as set forth in equation (1).

If NUC is stable, then:

$$sup\left\{T^{n+1} = \frac{T^n}{C_D}, T_{Min}\right\} \quad (1)$$

For example, with the decay constant ($C_D$) set to 1.0233, the threshold 600 may decrease from 100 to 10 over a period of 100 frames. After reaching some pre-defined minimum value, the threshold may stay constant until the NUC offset terms are deemed to be no longer stable, in which case the threshold may be gradually increased or instantaneously reset to its original, much higher, value.

In accordance with an embodiment, because fractional pixel motion may not be calculated and/or fractional pixel accuracy may not be guaranteed, pixels at or near a strong edge (gradient) may have distorted values. This may cause errors when comparing the values. Accordingly, masking 134 (or 334) may include masking out pixels on or along edges or other strong gradients.

In general in accordance with some embodiments, it may be difficult to identify what is scene information from what is static noise (i.e., FPN) or temporal noise. As discussed above, for example, the SNR may be as low as one or less. Thus, to remove high amplitude noise, the algorithm may need to be fairly aggressive when categorizing a measured difference in scene irradiance as noise. This may make it more difficult to include a threshold to filter out outliers.

For example, a moving object within a scene, for which only a single global motion vector is estimated, may cause an error because, by definition, it will have a motion other than the global frame-to-frame motion. When comparing irradiance values for sensor elements affected by the moving object, an error may be introduced if this effect is not compensated for. Thus, an erroneous value may be added to the NUC table and may be seen in a resulting image as an offset error, which as a result may be increasing FPN instead of reducing FPN. Consequently to prevent this from occurring in accordance with an embodiment, the algorithm may calculate local motion vectors for each pixel, although this may increase the complexity of the algorithm. For low-contrast scenes, where SBNUC potentially may provide the greatest benefit, local motion vectors may be difficult to calculate simply because there is very little local scene structure/information.

In accordance with an embodiment and as discussed herein, the algorithm techniques disclosed herein provide a number of measures to minimize these error sources. For example in accordance with an embodiment, the weight of an individual measurement may be adapted to make a new offset map converge to the true FPN. To do this, the "certainty" of an individual motion estimate may be used. Also as information is accumulated, a threshold may be introduced and gradually decreased to the point where any potential errors of a magnitude visible to a user may be considered outliers and not used. Alternatively, the maximum correction per iteration may be limited. For example in the later case, an instantaneous offset measure of, for example, 20 units may only result in a correction of, for example, 5 units.

Referring again to FIGS. 1 and 3 and in accordance with some embodiments, measured differences for all non-masked out pixels may be propagated. The resultant NUC offset term ($O^{n+1}$) may be the weighted sum (Equation 2 below) of the current NUC offset term ($O^n$) and new information from the last calculated difference 102 between a sensor element and the corresponding sensor element in the template frame (the instantaneous offset).

Propagation of information may be done by first subtracting 162 the current NUC offset term from the template frame. In an example embodiment, if this was not performed, then only the high spatial frequency FPN would be eliminated. Thus, by propagating the NUC offset terms, all FPN may be calculated relative to the golden pixel offset, which is fixed (e.g., set to zero). The weights may be proportional to the certainty (figure of merit) of the last motion estimate (F), the accumulated certainty of the NUC term being propagated (C) and the accumulated certainty in the certainty map 114 for the NUC term being updated 135.

$$O_{i,j}^{n+1} = \frac{C_{i,j}^n \cdot O_{i,j}^n + P_{i,j}^{n+1} \cdot D_{i,j}^{n+1}}{C_{i,j}^n + P_{i,j}^{n+1}}, \quad [i,j] \ni M \subset \{0 \le i < r, 0 \le j < c\} \quad (2)$$

$$D_{i,j}^{n+1} = I_{i,j} - \overset{T \to I}{W}(T_{k,l} - O_{k,l}^n) \quad (3)$$

$$C_{i,j}^{n+1} = C_{i,j}^n + P_{i,j}^{n+1} \quad (4)$$

$$P_{i,j}^{n+1} = \overset{T \to I}{W}(C_{k,l}^n) \cdot F^{n+1} \quad (5)$$

In equations two through five, $O_{i,j}^n$ is the accumulated offset term at pixel coordinate i,j after n iterations of the filter. $W^n$ is the function that warps the template pixels 111 to the same scene coordinates as the current frame, in other words the function that registers the two images being compared. For a single global motion estimate, the warp is reduced to a pure horizontal and vertical shift if the model is limited to translational motion. Local motion estimates and more complex motion models will require more complex warping functions and possibly different warping functions for different pixels, in accordance with an embodiment of the present invention and as would be understood by one skilled in the art.

$F^{n+1}$ is the figure of merit from the image registration process. This could represent some normalized correlation value between frame and template or some known or calculated normalized sensor error, for example, if MEMS rate gyros are used.

M is the subset of coordinates in the interval $\{0 \le i < r, 0 \le j < c\}$ that are valid for update in this iteration as defined by the masking process 134 (FIG. 1), 60 (FIG. 6), where r and c are the number of rows and column of the sensor array. In accordance with an embodiment, the golden pixel may never be updated and its NUC offset term may always be zero (or some constant).

$D_{i,j}^{n+1}$ is the difference in measured signal between sensor element [i, j] in the current frame I and the offset corrected signal from the template frame T.

$$W^{T \to I}$$

is the warping function that registers the template and the current image.

$$W^{T \to I}$$

warps T so that $T_{k,l}$ and $I_{i,j}$ image the same point in the scene. $P_{i,j}^{n+1}$ is the propagated certainty. This certainty is the product of the accumulated certainty for the Template pixel ($C_{k,l}^n$) and the figure of merit of the current motion estimate ($F^n$). In equation (5), it is also shown that the warping function $$W^{T \to I}$$

is used to warp coordinates (k,l) in the template space to (i,j) in the current frame space. Note generally that this has no effect on the actual value of propagated certainty.

For every pair of image and template with known motion, the entire process or part of the process may be repeated for the reverse direction of motion. This may be done by reversing the frame order by replacing the template (T) with the current frame (I) and replacing the current frame with the template. Global or per pixel motion may also be reversed. Thus, by computing the reverse direction, information will propagate in two opposite directions and will therefore spread faster to cover the entire frame.

Figure 7:
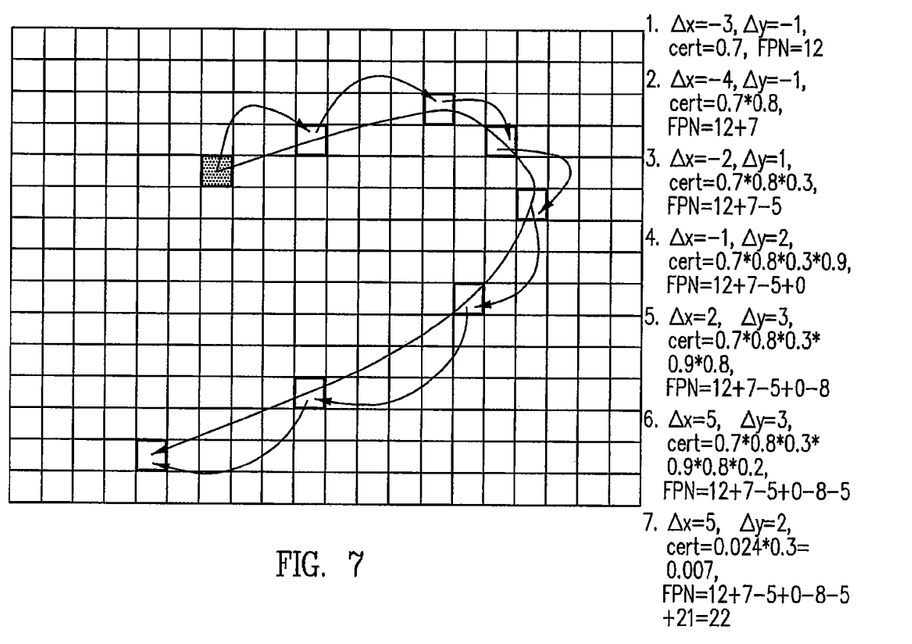
FIG. 7 shows a block diagram illustrating information propagation in accordance with an embodiment of the present invention.

FIG. 7 illustrates information propagation from the original "golden pixel" from one sensor element to another, depending on the registered frame-to-frame motion, in accordance with one or more embodiments of the present invention. Because all information stems from a single golden pixel, for this example, values of sensor elements are effectively being compared at an arbitrary distance and not limited to the actual frame to frame motion. Consequently, this enables the algorithm to correct for very low spatial frequency FPN. After a few frames of random motion, there will be many pixels with valid NUC terms and therefore many sources of information.

Figure 8:
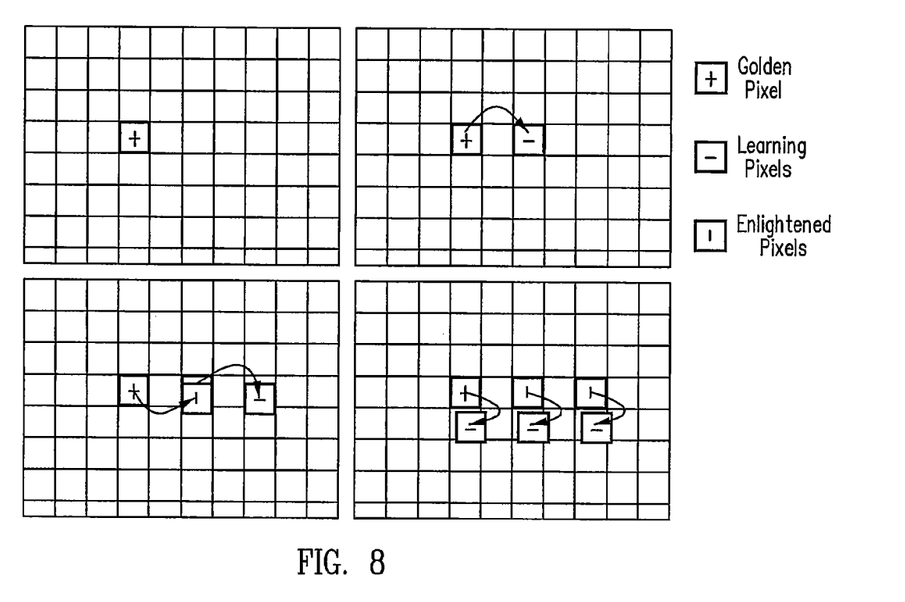
FIG. 8 shows a block diagram illustrating information propagation in accordance with an embodiment of the present invention.

FIG. 8 illustrates multiple pixels being updated and information propagated. When a pixel has accumulated enough certainty for it to propagate its corrected value, in other words a certainty higher than the predetermined threshold value, the pixel may be referred to as an "enlightened" pixel. For example, the algorithm begins with the golden pixel, whose information is propagated to another pixel (learning pixel), which may become an enlightened pixel that propagates its information to another learning pixel. Thus in this fashion, the algorithm propagates through all of the pixels to minimize FPN.

In accordance with an embodiment, algorithm 10 (or algorithm 30) may include updating 124 (or 326 as in FIG. 3) the certainty map 114 for all valid pixels. The updated certainty may be the sum of the current value in the certainty map added to the certainty propagated with the last update. The propagated certainty is the product of the certainty for this motion estimate and the certainty from which the information was propagated. In accordance with an embodiment, the golden pixel certainty may remain constant at a relatively high value.

In accordance with an embodiment, algorithm 10 of FIG. 1 may go through a series of iterative steps, updating the NUC terms so that FPN is reduced or minimized. When the NUC terms are determined to be stable 125, the NUC may be applied to the image 130. This may take a few seconds of camera motion, depending on the scene and the magnitude of FPN.

Figure 9:
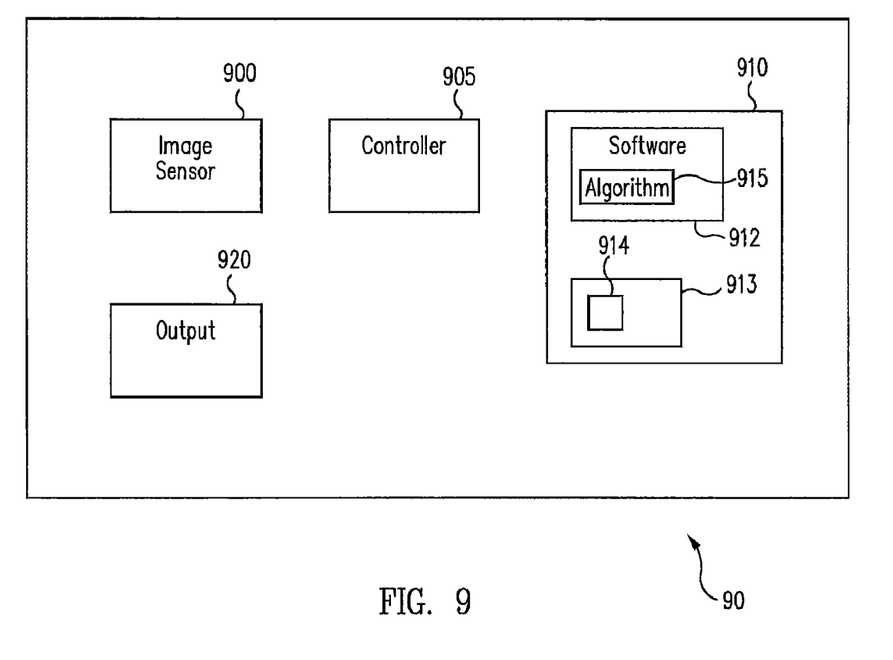
FIG. 9 shows a block diagram illustrating an infrared camera system in accordance with an embodiment of the present invention.

FIG. 9 illustrates an example of an imaging system 900 in accordance with one or more embodiments of the present invention. System 900 may include an infrared image sensor 900 that receives infrared radiation and provides infrared images (e.g., infrared image data). The infrared images, or at least some frames from the image or stream of images, may be stored at least temporarily in a memory 910 (e.g., any type of memory, such as a memory cache 913 for storing infrared images 914). A controller 905 (e.g., a microprocessor, microcontroller, or other type of logic circuit such as a programmable logic device) may be configured to process the infrared images in accordance with software 912 (e.g., machine readable instructions, configuration data, etc.) stored in memory 910. Software 912 may include an algorithm 915 (e.g., which represents algorithm 10, 20, or 30) for performing SNBUC processing on the infrared image data. System 900 may also include an output interface 920, which for example may provide an output electronic signal (e.g., wired or wireless, which may represent output 150 of FIG. 1 or output 350 of FIG. 3) for remote storage or display and/or may provide a video display to display the SBNUC-corrected images to a user of system 900.

System 900 may represent an infrared camera configured to generate infrared image data and process the data with SBNUC algorithms, in accordance with one or more embodiments. Alternatively, system 900 may represent a processing system (or a processing system and an infrared camera system) for receiving infrared image data (e.g., from an infrared camera or memory storing infrared image data from an infrared camera) and processing the infrared image data with SBNUC algorithms as disclosed herein, in accordance with one or more embodiments.

Furthermore in accordance with one or more embodiments, software 912 may be stored in portable memory (e.g., a portable hard drive, compact disk, flash memory, or other type of portable computer readable medium). For example, software 912 may represent instructions for performing various techniques disclosed herein (e.g., algorithm 10 or 30), which may be stored on a compact disk or downloaded (e.g., via a network, such as the Internet) and received by system 900 to perform SBNUC on infrared image data.

In accordance with one or more embodiments, SBNUC algorithms as disclosed herein in accordance with the present disclosure may not be limited to correcting high spatial frequency FPN only, but rather to FPN generally. For example, conventional NUC techniques may only address FPN for high spatial frequencies, because they require a significant overlap between images and therefore the maximum distance between two sensor elements being compared for signal output from a common scene coordinate is also limited.

Furthermore in accordance with one or more embodiments, SBNUC algorithms as disclosed herein in accordance with the present disclosure may be effective even with very little camera motion. For example, because the offset errors are propagated, the infrared image needs only to move one pixel (e.g., accomplished by moving the infrared detector or one of the lenses a few micrometers). By implementing the techniques disclosed herein, even a fixed mount infrared camera looking at a static scene may use the disclosed SBNUC algorithms. Furthermore, interpolation techniques may be employed to increase the virtual resolution of the infrared sensor (infrared detector) and apply the same SBNUC algorithm using only sub-pixel shifts, as would be understood by one skilled in the art. Consequently, internal vibration alone (e.g., due to a sterling cooler in a cooled infrared camera or other internal infrared camera mechanisms), for example, may provide enough motion for the SBNUC algorithms disclosed herein to operate effectively.

SBNUC algorithms, in accordance with one or more embodiments of the present disclosure, may also effectively handle relatively high amplitude FPN. For example, the SBNUC algorithms may be applied to non-calibrated images (e.g., having a SNR of much less than one). Thus, the SBNUC algorithms may provide a realistic alternative to the conventional shutter typically used in infrared cameras for offset compensation. Additionally, the techniques disclosed herein may simplify the calibration procedure by dynamically creating NUC offset tables for conditions not handled in the calibration process.

SBNUC algorithms, in accordance with one or more embodiments of the present disclosure, may also not require a large amount of data to be effective. For example, by looping over a set of frames with known frame to frame motion a number of times, the SBNUC algorithm may significantly reduce severe FPN. Thus, the SBNUC algorithms may be suitable for applications where only a few frames with known motion are available. As an example, under perfect conditions (e.g., no temporal noise, no registration errors, and no scene changes), only two motion vectors may be needed (e.g., given that they can be used as basis vectors for the 2D projection of the scene on the detector plane, i.e. they must not be vectors along the same 1D axis). For this example, we may only need three frames of infrared image data. In general, perfect registration and total elimination of temporal noise is difficult to achieve without distortion of the infrared image. However, experiments have shown the SBNUC algorithm to perform well with relatively few frames of data (e.g., ten or more frames of infrared image data).

SBNUC algorithms, in accordance with one or more embodiments of the present disclosure, may also produce relatively few artifacts (e.g., by utilizing masking process 134/334 and/or certainty map 114 techniques). Furthermore for example, by applying the thresholding techniques and the certainty weighting described herein, the risk of introducing strong artifacts is minimized. Additionally, by using a decaying threshold strategy (e.g., threshold decay process 601), the SBNUC algorithm may produce a correct set of offset terms (e.g., within 50-500 frames, depending on the amount of FPN and the type of scene).

SBNUC algorithms, in accordance with one or more embodiments of the present disclosure, may also be suitable for integration with external motion sensors. For example by using the masking process and the certainty values that may be applied to an output of any infrared sensor type, the SBNUC algorithm may work well even under conditions where there is almost no scene information (e.g., due to very high levels of FPN or because the system is imaging a low contrast scene, such as fog or sky). Thus, the SBNUC algorithm may not be dependant on accurate local optical flow estimates, but rather may only require that the motion errors are approximately random and, if severe, detectable by the masking process techniques disclosed herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method of processing infrared images of a scene captured by an infrared image sensor comprising a plurality of sensor elements, the method comprising:
   receiving a first frame comprising a first plurality of pixel data of a first infrared image;
   receiving a second frame comprising a second plurality of pixel data of a second infrared image;
   determining frame-to-frame motion between the first frame and the second frame, wherein the frame-to-frame motion identifies portions of the first and second pixel data corresponding to identical scene coordinates captured by different sensor elements for the first and second frames;
   determining irradiance differences between the first and second portions of pixel data; and
   determining pixel offset information for scene based non-uniformity correction terms based on the irradiance differences and the frame-to-frame motion.

2. The method of claim 1, further comprising:
   determining a certainty estimate associated with each scene based non-uniformity correction term;
   selectively applying each scene based non-uniformity correction term to the second plurality of pixel data based on the associated certainty estimate to reduce fixed pattern noise; and
   providing an output infrared image after the applying.

3. The method of claim 1, wherein the determining pixel offset information comprises propagating the pixel offset information determined for a first one of the scene based non-uniformity correction terms to a second one of the scene based non-uniformity correction terms.

4. The method of claim 3, further comprising:
   selecting a pixel corresponding to one of the identical scene coordinates and associated with the first one of the scene based non-uniformity correction terms; and
   defining the selected pixel to have a substantially constant offset regardless of the selected pixel's location in the first and second image frames.

5. The method of claim 3, further comprising updating the scene based non-uniformity correction terms based on the irradiance differences and the propagating.

6. The method of claim 1, wherein the determining frame-to-frame motion comprises detecting motion of the infrared image sensor using a motion sensor or by performing a motion prediction.

7. The method of claim 1, wherein the determining frame-to-frame motion comprises warping the portion of the first pixel data to correspond to the portion of the second pixel data.

8. The method of claim 1, wherein the frame-to-frame motion comprises a horizontal shift and a vertical shift.

9. The method of claim 1, wherein the scene based non-uniform correction terms comprise a first set of calibration data, the method further comprising applying a second set of calibration data to the first and second frames prior to the determining frame-to-frame motion.

10. The method of claim 9, wherein the first set of calibration data comprises either:
    factory non-uniform correction terms; or
    the scene based non-uniform correction terms as determined by a previous iteration of the method.

11. A system comprising:
    an infrared image sensor comprising a plurality of sensor elements and adapted to provide pixel data for a plurality of infrared images;
    a memory adapted to store the pixel data; and
    a controller adapted to perform infrared image processing on the pixel data, the processing comprising:
        receiving a first frame comprising a first plurality of pixel data of a first infrared image,
        receiving a second frame comprising a second plurality of pixel data of a second infrared image,
        determining frame-to-frame motion between the first frame and the second frame, wherein the frame-to-frame motion identifies portions of the first and second pixel data corresponding to identical scene coordinates captured by different sensor elements for the first and second frames,
        determining irradiance differences between the first and second portions of pixel data, and
        determining pixel offset information for scene based non-uniformity correction terms based on the irradiance differences and the frame-to-frame motion.

12. The system of claim 11, wherein the processing further comprises:
    determining a certainty estimate associated with each scene based non-uniformity correction term;
    selectively applying each scene based non-uniformity correction term to the second plurality of pixel data based on the associated certainty estimate to reduce fixed pattern noise; and
    providing an output infrared image after the applying.

13. The system of claim 11, wherein the determining pixel offset information comprises propagating the pixel offset information determined for a first one of the scene based non-uniformity correction terms to a second one of the scene based non-uniformity correction terms.

14. The system of claim 13, wherein the processing further comprises:
    selecting a pixel corresponding to one of the identical scene coordinates and associated with the first one of the scene based non-uniformity correction terms; and
    defining the selected pixel to have a substantially constant offset regardless of the selected pixel's location in the first and second image frames.

15. The system of claim 13, wherein the processing further comprises updating the scene based non-uniformity correction terms based on the irradiance differences and the propagating.

16. The system of claim 11, wherein the determining frame-to-frame motion comprises detecting motion of the infrared image sensor using a motion sensor or by performing a motion prediction.

17. The system of claim 11, wherein the determining frame-to-frame motion comprises warping the portion of the first pixel data to correspond to the portion of the second pixel data.

18. The system of claim 11, wherein the frame-to-frame motion comprises a horizontal shift and a vertical shift.

19. The system of claim 11, wherein the scene based non-uniform correction terms comprise a first set of calibration data, the processing further comprising applying a second set of calibration data to the first and second frames prior to the determining frame-to-frame motion.

20. The system of claim 19, wherein the first set of calibration data comprises either:
    factory non-uniform correction terms; or
    the scene based non-uniform correction terms as determined by a previous iteration of the processing.

* * * * *